(12) United States Patent
Tomani et al.

(10) Patent No.: US 8,172,981 B2
(45) Date of Patent: *May 8, 2012

(54) SEPARATING LIGNIN FROM BLACK LIQUOR BY PRECIPITATION, SUSPENSION AND SEPARATION

(75) Inventors: Per Tomani, Huddinge (SE); Fredrik Öhman, Gävle (SE); Hans Theliander, Göteborg (SE); Peter Axegard, Solna (SE)

(73) Assignee: LignoBoost AB, Stockholm (SE)

( * ) Notice: Subject to any disclaimer, the term of this patent is extended or adjusted under 35 U.S.C. 154(b) by 185 days.

This patent is subject to a terminal disclaimer.

(21) Appl. No.: 12/071,436

(22) Filed: Feb. 21, 2008

(65) Prior Publication Data

US 2008/0214796 A1    Sep. 4, 2008

Related U.S. Application Data

(63) Continuation-in-part of application No. 11/659,733, filed as application No. PCT/SE2005/001301 on Sep. 8, 2005.

(30) Foreign Application Priority Data

Sep. 14, 2004  (SE) .................................... 0402201

(51) Int. Cl.
*D21C 11/00* (2006.01)
*C07G 1/00* (2011.01)
*C08H 7/00* (2011.01)
*C08L 97/00* (2006.01)

(52) U.S. Cl. ........................................ 162/16; 530/500

(58) Field of Classification Search ............... 530/500; 162/16

See application file for complete search history.

(56) References Cited

U.S. PATENT DOCUMENTS

| | | | | | |
|---|---|---|---|---|---|
| 1,699,845 | A | * | 1/1929 | Howard | 530/500 |
| 1,848,292 | A | * | 3/1932 | Howard | 530/500 |
| 1,924,361 | A | * | 8/1933 | Howard | 530/500 |
| 2,167,556 | A | * | 7/1939 | Smull | 162/16 |
| 2,464,828 | A | * | 3/1949 | Pollak et al. | 530/500 |
| 2,541,058 | A | | 2/1951 | Heritage et al. | |
| 2,701,255 | A | * | 2/1955 | Heritage et al. | 556/108 |
| 2,816,831 | A | * | 12/1957 | Goddard | 162/16 |
| 2,828,297 | A | * | 3/1958 | Giesen | 530/500 |
| 2,994,633 | A | * | 8/1961 | Clark | 162/16 |
| 3,222,160 | A | * | 12/1965 | Ramus | 71/23 |
| 3,404,063 | A | * | 10/1968 | Harding | 162/16 |

(Continued)

FOREIGN PATENT DOCUMENTS

GB       664811        1/1992

(Continued)

OTHER PUBLICATIONS

Ripperger et al., Filtration, 2. Equipment, Ullmann's Encyclopedia of Industrial Chemistry, 2002.*

(Continued)

*Primary Examiner* — Liam Heincer
(74) *Attorney, Agent, or Firm* — Young & Thompson (57) ABSTRACT

A method for controlling the sodium and sulphur balance of a pulp mill while separating lignin from black liquor, and also a lignin product or an intermediate lignin product obtainable by the method. The present invention also provides use of a lignin product or an intermediate lignin product for the production of fuel (solid, gaseous or liquid) or materials.

19 Claims, 7 Drawing Sheets

U.S. PATENT DOCUMENTS

| | | | |
|---|---|---|---|
| 3,428,520 A * | 2/1969 | Yiannos | 162/38 |
| 3,806,403 A * | 4/1974 | Ferguson | 162/16 |
| 3,895,996 A | 7/1975 | Lange et al. | |
| 4,085,000 A * | 4/1978 | Otrhalek et al. | 530/205 |
| 4,470,876 A | 9/1984 | Beaupre et al. | |
| 4,740,591 A * | 4/1988 | Dilling et al. | 530/505 |
| 5,288,857 A | 2/1994 | Aarsrud et al. | |
| 5,635,024 A | 6/1997 | Shall | |
| 5,773,590 A * | 6/1998 | Hart | 530/500 |
| 5,777,086 A * | 7/1998 | Klyosov et al. | 530/500 |
| 5,788,812 A | 8/1998 | Agar et al. | |
| 5,811,527 A | 9/1998 | Ishitoku et al. | |
| 6,420,533 B1 * | 7/2002 | Lightner | 530/500 |
| 2002/0129910 A1 * | 9/2002 | Lightner | 162/16 |
| 2004/0244925 A1 * | 12/2004 | Tarasenko | 162/16 |
| 2005/0197490 A1 * | 9/2005 | Rojas et al. | 530/205 |
| 2005/0203279 A1 * | 9/2005 | Rojas et al. | 530/205 |
| 2008/0047674 A1 * | 2/2008 | Ohman et al. | 162/16 |
| 2008/0051566 A1 * | 2/2008 | Ohman et al. | 530/500 |

FOREIGN PATENT DOCUMENTS

| | | |
|---|---|---|
| WO | WO 9006964 | 6/1990 |
| WO | WO 2004 013409 A1 | 2/2004 |
| WO | WO 2006031175 A1 * | 3/2006 |
| WO | WO 2006038863 A1 * | 4/2006 |

OTHER PUBLICATIONS

Davy M F, et al., "Economic Evaluation of Black Kiquor Treatment Processes for Incremental Kraft Pulp Production"83 RD Annual Meeting of the Technical SE Part A; Montreal, Canada. Jan. 28-31, 1997; ISSN 0316-6732; p. 2, col. 1.

Ohman F, et al., "Filtration Properties of Lignin Precipitated From B Lack Liquor"; International Chemical Recovery Conference; Whistler, BC, Canada Jun. 11-14, 2001. AN E200143669598.

* cited by examiner

Pilot plant study.
Titrations on lignin slurry to study acid consumption for acidification.
Lignin filter cakes from the first filtration step (10% suspension conc.) are titrated with $H_2SO_4$.

SEPARATING LIGNIN FROM BLACK LIQUOR BY PRECIPITATION, SUSPENSION AND SEPARATION

The present invention relates to a method for controlling the sodium and sulphur balance of a pulp mill while separating lignin from black liquor, and also a lignin product or an intermediate lignin product obtainable by said method. The present invention also provides use of a lignin product or an intermediate lignin product for the production of fuel (solid, gaseous or liquid) or materials.

BACKGROUND OF THE INVENTION

WO2006/031175 discloses a method for separation of lignin from black liquor comprising the following steps: a) Precipitation of lignin by acidifying black liquor and thereupon dewatering, b) suspending the lignin filter cake obtained in step a) whereupon a second lignin suspension is obtained and adjusting the pH level to approximately the pH level of the washing water of step d) below, c) dewatering of the second lignin suspension, d) addition of washing water and performing a displacement washing at more or less constant conditions without any dramatic gradients in the pH, and e) dewatering of the lignin cake produced in step d) into a high dryness and displacement of the remaining washing liquid in said filter cake, whereby a lignin product is obtained which has an even higher dryness after the displacement washing of step e).

WO2006/038863 discloses a method for precipitating (separation) of lignin, using small amounts of acidifying agents, whereby a lignin product or an intermediate lignin product is obtained which can be used as fuel or chemical feed stock (or as a chemical or a raw material for further refining), from a lignin containing liquid/slurry, such as black liquor.

The present invention also provides a method for separation of lignin from a lignin containing liquid/slurry, such as black liquor, whereby a more pure lignin is obtained. Said document also discloses a lignin product or an intermediate lignin product obtainable by the above methods. Said document also discloses use, preferably for the production of heat or for use as chemical, of said lignin product or intermediate lignin product.

When separating lignin from black liquor, which may be achieved through a precipitation in a process, the resulting lignin slurry may be filtered, e.g. in a filter press. The filtrate remaining in the filter cake may cause an increased acid consumption in subsequent process steps. If a large amount of sulphuric acid is added in the process, it can lead to problems with the Na/S balance in the pulp mill as well as increased chemical costs. Therefore, it would be of interest to wash the filter cake and displace the filtrate with another solution. The solubility of lignin is dependent on temperature, ionic strength and pH in the solution (Magnus Norgren, "On the Physical Chemistry of Kraft Lignin, Fundamentals and Applications", Doctoral Thesis, Physical Chemistry 1, Lund University, 2001). It is not possible to successfully wash lignin by directly applying an acidic wash liquor because of problems with plugging of the filter cake and high yield losses (Fredrik Öhman "Precipitation and separation of lignin from kraft black liquor", Forest products and Chemical Engineering, Department of Chemical and Biological Engineering, Chalmers University of Technology, Göteborg, Sweden, 2006 and Öhman, F. & Theliander, H., "Washing lignin precipitated from kraft black liquor", Paperi Ja Puu, Vol. 88, no 5, 287-292 (2006) and Öhman, F., Wallmo, H. & Theliander, H., "A Novel method for washing lignin precipitated from kraft black liquor—Laboratory trails", Nordic Pulp and Paper Research J., 22 (2007): 1, 9-16

Mixing acidic wash liquor and alkaline filtrate also leads to uncontrolled release of hydrogen sulphide, which can increase the costs of the process.

Accordingly it would be desirable to be able to provide a method for controlling the Na/S balance in a pulp mill when at the same time lignin is separated from black liquor.

SUMMARY OF THE INVENTION

The present invention provides a solution for controlling the Na/S balance in a pulp mill at the same time lignin in separated from black liquor, which there is a need for as set out above, and said invention provides, according to a first aspect, a method for separation of lignin from black liquor comprising the following steps:
  a) precipitation of lignin by acidifying black liquor, preferably by using $CO_2$, resulting in a lignin suspension and if necessary followed by maturing of the lignin suspension and thereupon separation, thereby forming a cake of solid material, thus a lignin filter cake, and optionally washing the lignin filter cake with a filtrate as set out under step d), and when needed enhancement of the lignin filter cake dryness, which optionally involves conveying the filtrate back to a pulp mill,
  b) suspending the lignin filter cake obtained in step a) and during the suspension operation adjusting the pH level to approximately the pH level of the washing water of step d) below, preferably at least a pH below 8, whereupon a second lignin suspension is obtained and leaving said suspension to mature (age), whereby also optionally additionally acidic liquid is added,
  c) separation of the second lignin suspension thereby forming a second cake of solid material, thus a second filter cake, and when needed enhancement of the lignin cake dryness, and thereafter adding acidified wash water and/or virgin acid for displacement washing and virgin washing liquid, such as clean water, also for said displacement washing followed by enhancement of the lignin filter cake dryness to the level specified for different use of lignin, and
  d) conveying the filtrate from step c) or selected part/-s of the filtrate from c) for using in the suspending of the lignin filter cake of step b) and/or for dilution before separation in step a) and/or addition as wash water to the filter cake produced in step a) whereby if needed the ionic strength and pH is adjusted before addition, preferably by adding ESP-dust (ElectroStatic Precipitator dust), such as pulp mill recovery boiler precipitator dust, in order to control the Na/S balance in a pulp mill.

The present invention also provides, according to a second aspect, a lignin product or an intermediate lignin product obtainable by said method. The present invention also provides, according to a third aspect, use of a lignin product or an intermediate lignin product according to the second aspect for the production of fuel (solid, gaseous or liquid) or materials.

DETAILED DESCRIPTION OF THE INVENTION

It is intended throughout the present description that the expression "acidifying" embraces any means for acidify the black liquor. Preferably the acidifying is performed by adding $SO_2(g)$, organic acids, HCl, $HNO_3$, carbon dioxide or sulphuric acid (in the form of fresh sulfuric acid or a so called "spent acid" e.g. from a chlorine dioxide generator) or mixtures thereof to said black liquor, most preferred by adding carbon dioxide or sulphuric acid.

It is intended throughout the present description that the expression "separation" embraces any means for separation. Preferably the separation is performed by using dewatering. Dewatering may be performed by using a mechanical method, such as by using centrifugation, a filter press apparatus, a band filter, a rotary filter, such as a drum filter, or a sedimentation tank, or similar equipment, or by using evaporation. Most preferred a filter press apparatus is used.

It is intended throughout the present description that the expression "filtrate" embraces any liquid obtained through any of the separation methods as set out above.

According to a preferred embodiment of the first aspect of the invention step d) also involves conveying filtrate back to a pulp mill optionally also involving that filtrate is conveyed to the black liquor before the precipitation of step a).

According to a preferred embodiment of the first aspect of the invention step d) also involves conveying filtrate from step c) either for using in a displacement washing in step a) during the separation, such as filtration, according to a) or for diluting the suspension before separation, such as filtration, and optionally displacement washing of the lignin cake, of the lignin suspension in a), wherein optionally the filtrate from step c) is adjusted regarding ionic strength and in pH, preferably to keep the pH equal to or below the pH to which precipitation in a) has been adjusted by $CO_2$, to avoid dissolution of lignin. The ionic strength is optionally adjusted preferably to keep the ionic strength equal or higher than the ionic strength in the lignin slurry which is filtered in a). However a lower pH of the filtrate from c) to be used as wash water and/or dilution liquid in a) results in less demand for ionic strength adjustments.

According to a preferred embodiment of the first aspect of the invention the fresh acidic liquid added in step b) is sulphuric acid and/or residual acid from chlorine dioxide manufacture, i.e. sesquisulfate, and/or acidic scrubber liquid, preferably sulphuric acid and sequisulfate.

According to a preferred embodiment of the first aspect of the invention the fresh acidic liquid added in step b) is virgin sulphuric acid and/or sulphuric acid and/or sulphurous acid both obtained from gaseous $SO_2$ in turn obtained from rich gases and/or by collecting recycled $H_2S$ gas from the suspending step b) and converting it into said $SO_2$, or sulphuric acid obtained by electrolysis of sodium sulphate. Said sodium sulphate is preferably emanating from ESP-dust (Electro-Static Precipitator dust) (also known as ESP-catch or ESP-ash). The recovery boiler in a pulp mill produces significant amount of ESP-dust which contains mainly sodium sulphate. This ESP-dust may to a large extent be recycled to the recovery boiler. Some amounts may further be removed to adjust imbalances in S or Na in the recovery cycle. Said sodium sulphate may as set out above be converted into sodium hydroxide and sulphuric acid by electrolysis (see e.g. U.S. Pat. No. 4,561,945). The sodium hydroxide can further be used in different positions in the pulp mill such as the bleach plant or in the recovery area. This approach eliminates the need for purchased sulphuric acid, the need to purge excess S by purging ESP-dust and thus the intake of sodium make up can be eliminated.

According to a preferred embodiment of the first aspect of the invention the virgin sulphuric acid and/or sulphuric acid and/or sulphurous acid obtained from $SO_2$ is added to the filtrate conveyed in step d).

According to a preferred embodiment of the first aspect of the invention step b) and/or c) involve addition of acidic liquid and/or virgin acid and/or $CO_2$, whereby the addition of acidic liquid and/or acid and/or $CO_2$ is increased if necessary and in step d) filtrate is conveyed for performing a soap acidulation thereby providing tall oil.

According to a preferred embodiment of the first aspect of the invention step d) also involves conveying filtrate or specific parts of the filtrate to an external treatment step such as different types of effluent treatments.

According to a preferred embodiment of the first aspect of the invention a salt is added before the separation (preferably filtration) of step c) and/or during the suspending in step b) thereby avoiding a low pH level, preferably said salt is ESP dust, such as recovery boiler ashes or boiler dust.

According to a preferred embodiment of the first aspect of the invention the filtrate from step c) is adjusted, when to be before the separation, preferably filtration, in step a) or as wash water in step a) separation, when regarding ionic strength and in pH, preferably to keep the pH equal to or below the pH to which precipitation in a) has been adjusted by $CO_2$, to avoid dissolution of lignin involving adding a salt, preferably said salt is ESP dust, such as recovery boiler ashes or boiler dust, or sodium sulphate.

According to a preferred embodiment of the first aspect of the invention step b) involves adjusting the pH level to approximately the pH level of the washing water of step c) below, preferably a pH below 8.

According to a preferred embodiment of the first aspect of the invention the separation of step a) and/or step c) is performed using dewatering in a filter press apparatus wherein the filter cake is blown through by gas or a mixture of gases, preferably flue gases, air or steam (vapour), most preferred air or overheated steam, in order to dispose of the remaining liquid.

According to a preferred embodiment of the first aspect of the invention the pH level is adjusted to below approximately pH 6 in step b), preferably below approximately pH 4, most preferred the pH level is a pH from 1 to 3.5.

According to a preferred embodiment of the first aspect of the invention the washing water used in step c) has a pH level of below approximately pH 6, preferably below approximately pH 4, most preferred the pH level is a pH from 1 to 3.5.

According to a preferred embodiment of the first aspect of the invention the lignin filter cake dryness of the filter cake obtained in step a) and/or c) is enhanced by displacement of the remaining liquid with gas or a mixture of gases, preferably flue gases, air, steam or superheated steam, most preferred air or superheated steam.

According to a preferred embodiment of the first aspect of the invention the filtrate from the first separation (preferably involving filtration) stage step a) is re-circulated directly to the pulp mill recovery system, if necessary, after re-alkalization.

According to a preferred embodiment of the first aspect of the invention the remaining washing liquor in the filter cake in step c) is removed as far as possible with air or flue gases, preferably flue gases from a recovery boiler, a lime kiln or a bark boiler, or steam or superheated steam.

The problems mentioned above can accordingly be solved by washing the lignin filter cake with a solution with sufficient ionic strength to keep the lignin in solid form. The solutions should preferably be prepared using substances that will not cause problems in the pulp mill recovery cycle or other parts of the pulp mill, and most preferred substances that already exist in the pulp mill to avoid disruptions of the chemical balances (example: recovery boiler ash). If the filtrates from the above described process are not recycled back to the pulp mill, other substances can also be used. The pH of the wash solution should preferably be equal to, or lower, than the precipitation pH but preferably not low enough to cause substantial uncontrolled release of hydrogen sulphide when it is mixed with alkaline filtrate. The temperature of the solution should preferably be the same as for the separation, preferably filtration, to avoid excessive energy consumption for heating and cooling.

Preferred features of each aspect of the invention are as for each of the other aspects mutatis mutandis. The prior art documents mentioned herein are incorporated to the fullest extent permitted by law. The invention is further described in the following example in conjunction with the appended figures, which do not limit the scope of the invention in any way. Embodiments of the present invention are described in more detail with the aid of an example of embodiments, the only purpose of which is to illustrate the invention and are in no way intended to limit its extent.

EXAMPLES

Examples

Washing Lignin in the First Filtration Stage of the Process According to the First Aspect of the Invention Two examples are given below where the method of the first aspect of the invention as set above is successfully applied in order to reduce the sulphuric acid consumption in the subsequent lignin washing steps, which thus enables the controlling of the Na/S balance in a pulp mill.

Example 1

Figure 3:
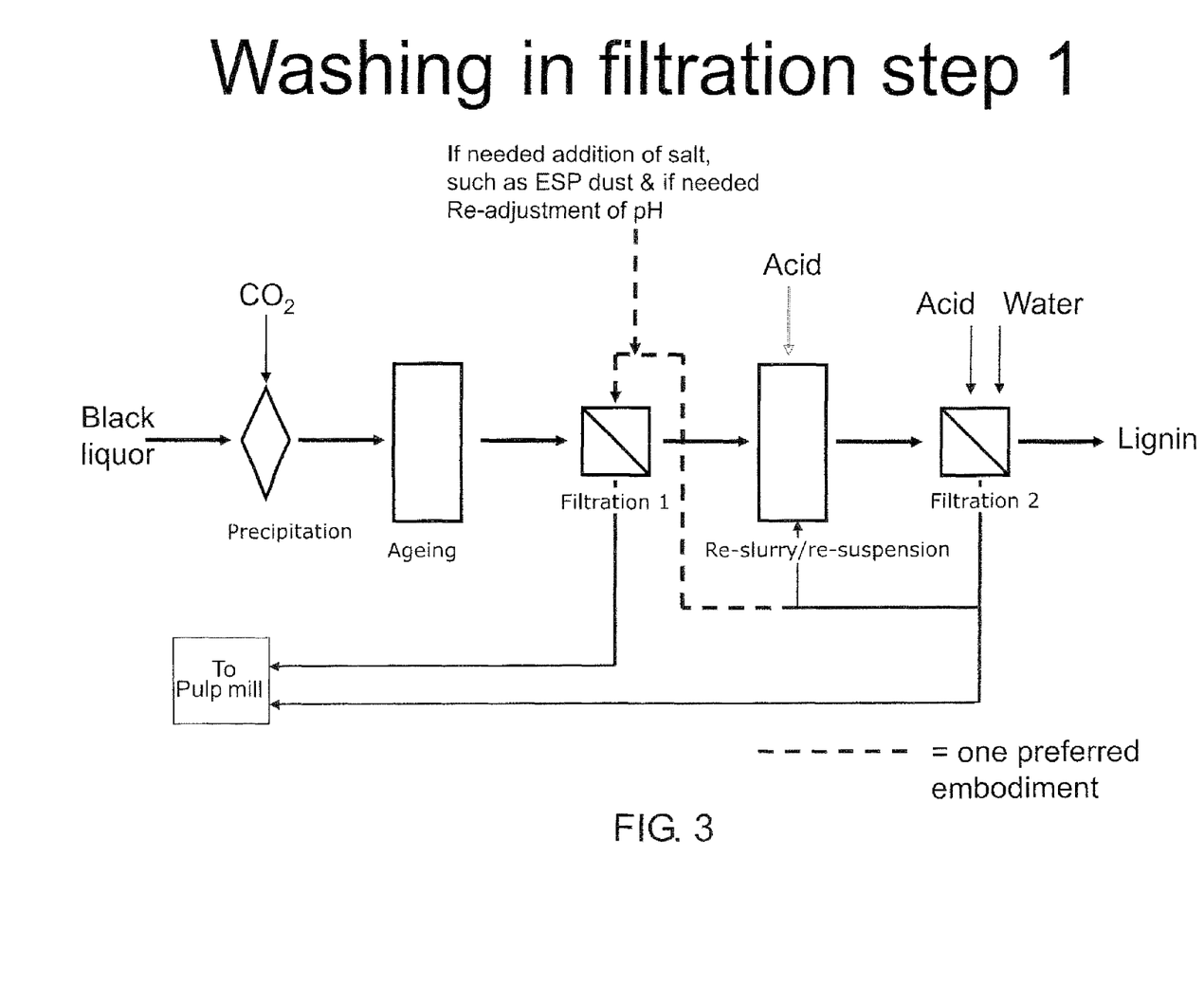
FIG. 3 shows one preferred embodiment of the invention; washing in filtration step 1.
Figure 4:
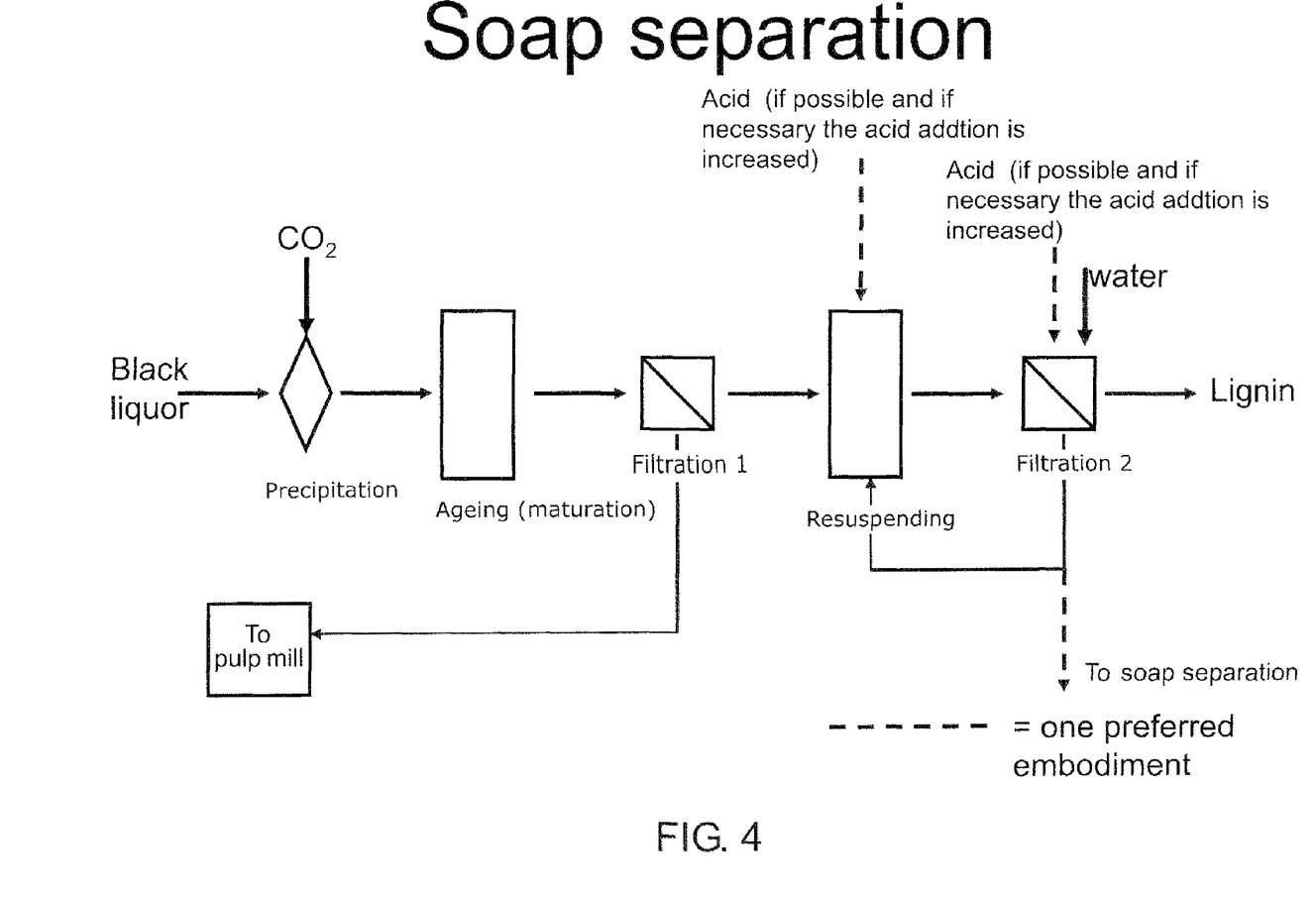
FIG. 4 shows one preferred embodiment of the invention; use of an acid rich filtrate flow from c) to the pulp mill soap separation process (soap acidulation).
Figure 5:
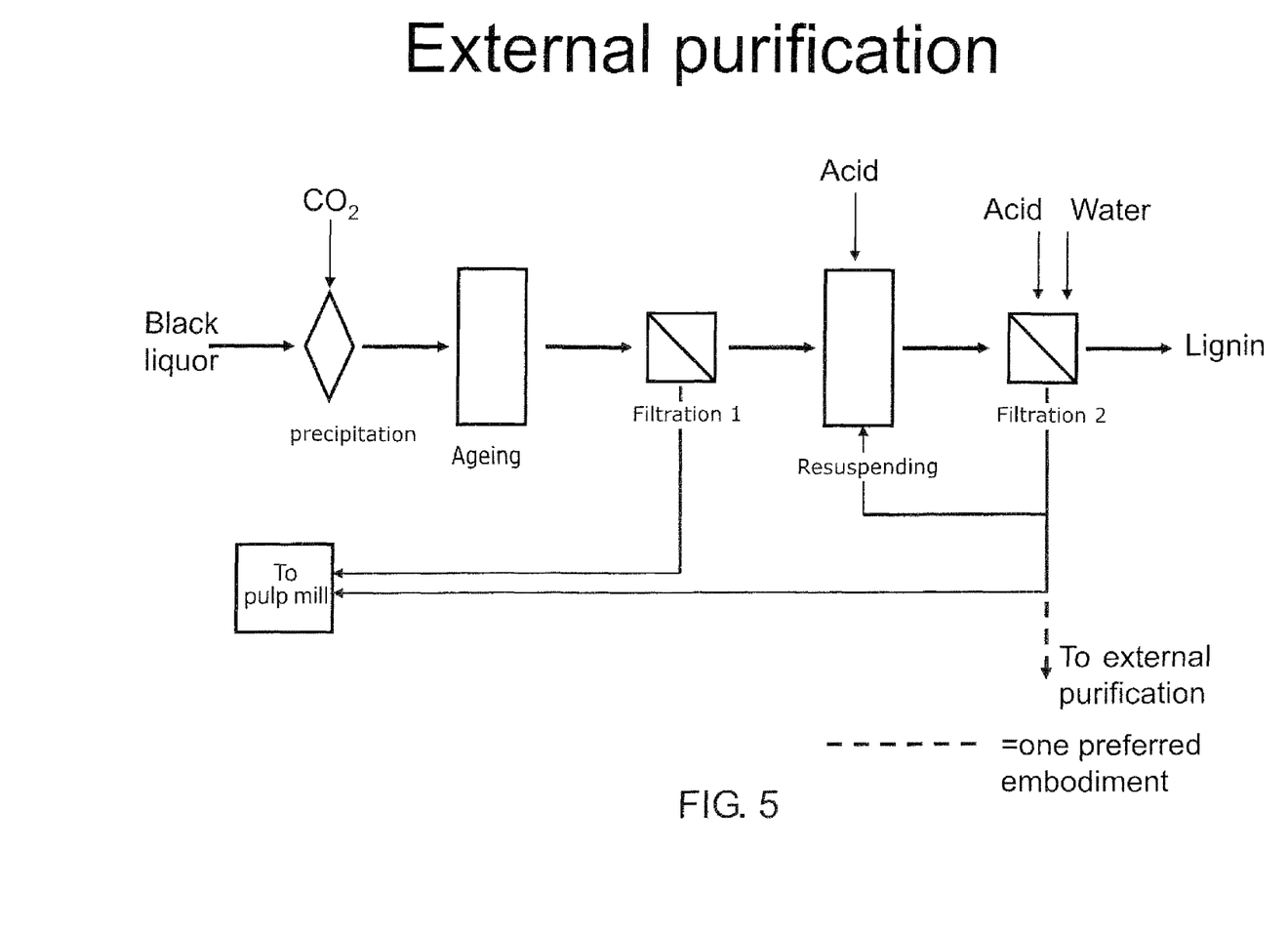
FIG. 5 shows one preferred embodiment of the invention; discharge of an acid rich filtrate from c) into the external treatment.
Figure 6:
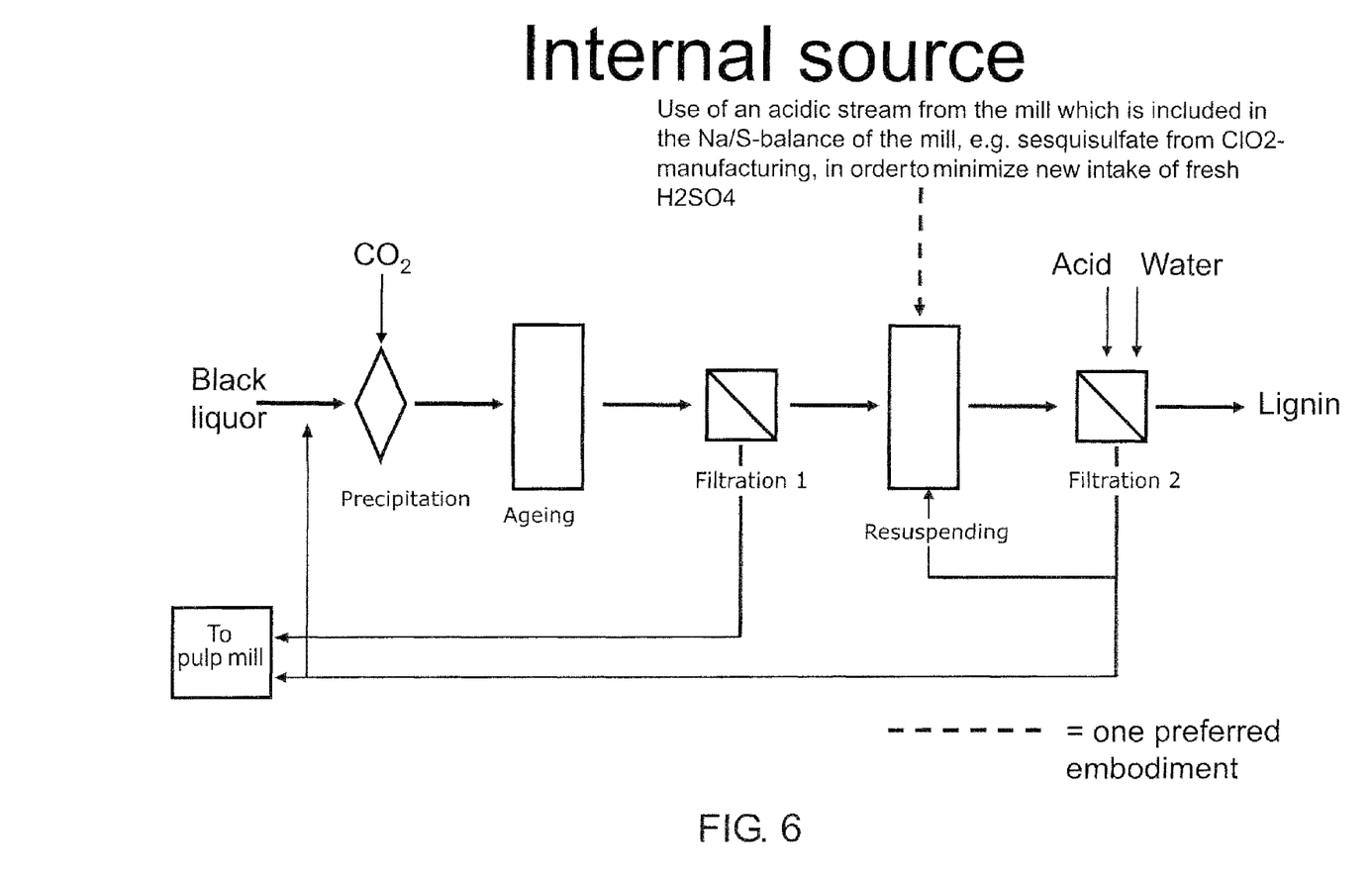
FIG. 6 shows one preferred embodiment of the invention; use of an internal source for acidification, such as remaining acid from $ClO_2$-production in the pulp mill.
Figure 7:
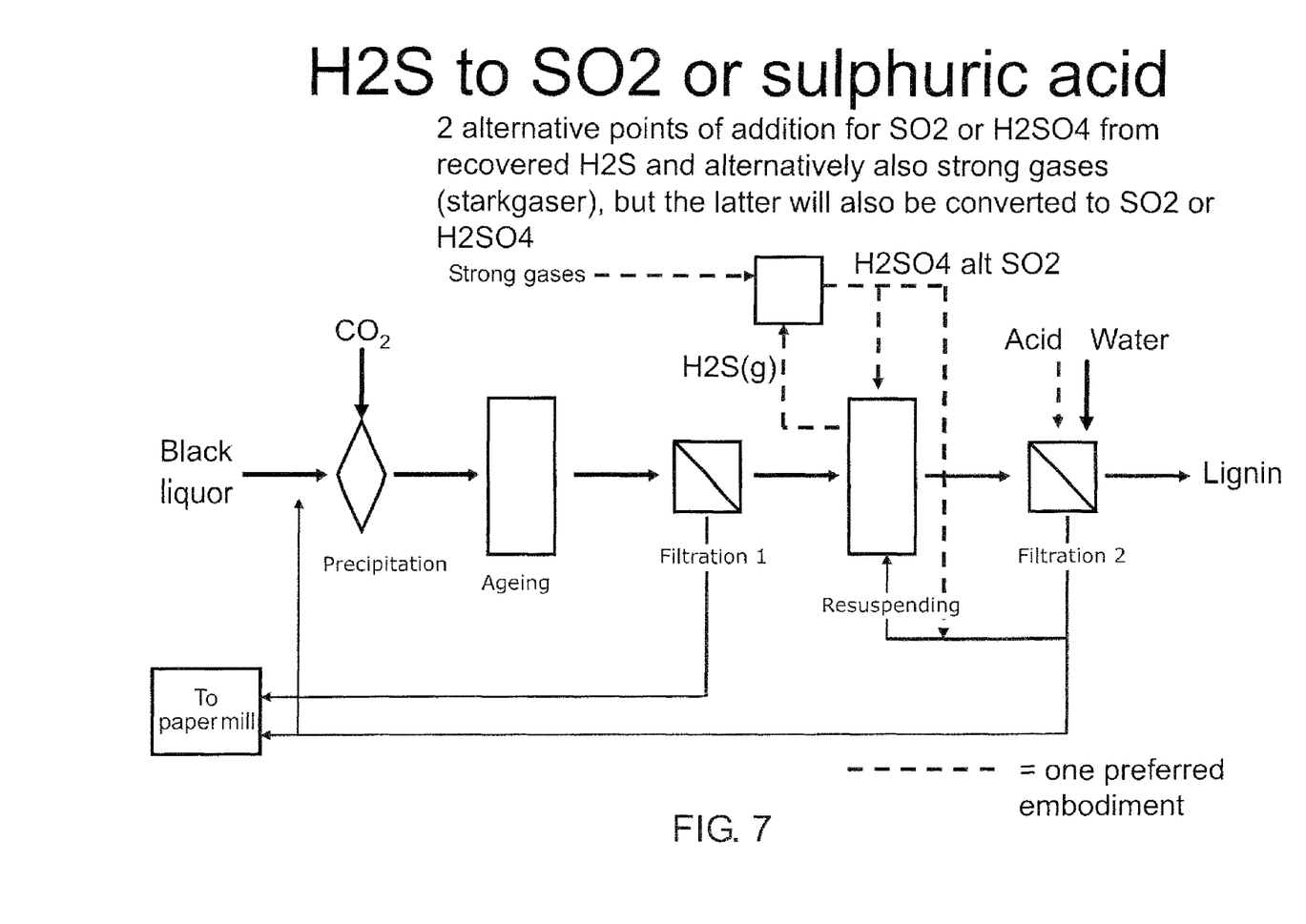
FIG. 7 shows one preferred embodiment of the invention; use of $H_2S$ to $SO_2$ or sulphuric acid produced from strong gases in the pulp mill.

Lignin was precipitated according to the method of the first aspect of the invention (see in particular appended FIG. 3). A filter cake of lignin was formed in a filter press. The filter cake was successfully washed by applying in this specific example a 7.5%-w solution of sodium sulphate in water. Sodium sulphate was chosen since it can be brought back to the recovery system without problems, is used by many kraft pulp mills as a make-up chemical, and is often also produced internally in the mill in many cases in form of sodium sesquisulphate for chlorine dioxide production in pulp bleaching. The sulphuric acid consumption in the subsequent re-slurrying stage could be reduced from the reference case (a filter cake pressed and air-dried to approximately 65% DS) by 50%.

Example 2

Lignin was precipitated according to the method of the first aspect of the invention (see in particular appended FIG. 3). A filter cake of lignin was formed in a filter press. The filter cake was successfully washed by applying in this specific example a 10%-w solution of recovery boiler precipitator dust (which is an ESP-dust) in water. The recovery boiler dust consists mainly of sodium sulphate, and is normally mixed together with strong black liquor before firing in the recovery boiler. The sulphuric acid consumption in the subsequent re-slurrying stage could be reduced in the same way as in Example 1.

The sulphuric acid consumption was lowered 170-180 kg/ton lignin to 90-105 kg/ton lignin. Experiments with the half amount of washing water gave also logically results between the well washed filter cake and the unwashed filter cake.

In the pilot plant study as set out above titrations were done on lignin slurry to study acid consumption for acidification. Lignin filter cakes from the first filtration step (10% suspension conc.) were titrated with $H_2SO_4$. The below appearing parameters were used in the pilot plant study:

Wash procedure according to the method of the first aspect of the invention during 2.5 minutes; test 1

Wash procedure according to the method of the first aspect of the invention during 2.5 minutes; test 2

Wash procedure according to the method of the first aspect of the invention during 5 minutes; test 1

Wash procedure according to the method of the first aspect of the invention during 5 minutes; test 2

Reference 1, 2 and 3 was without washing.

Figure 1:
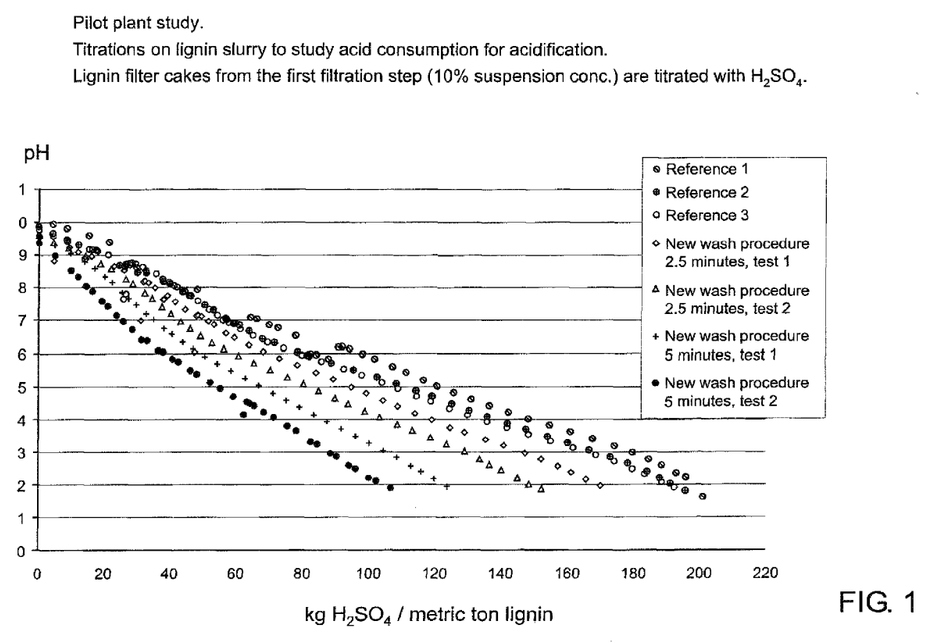
FIG. 1 shows the results obtained in a pilot plant study where acid addition in b) is reduced according to the above described new method.
Figure 2:
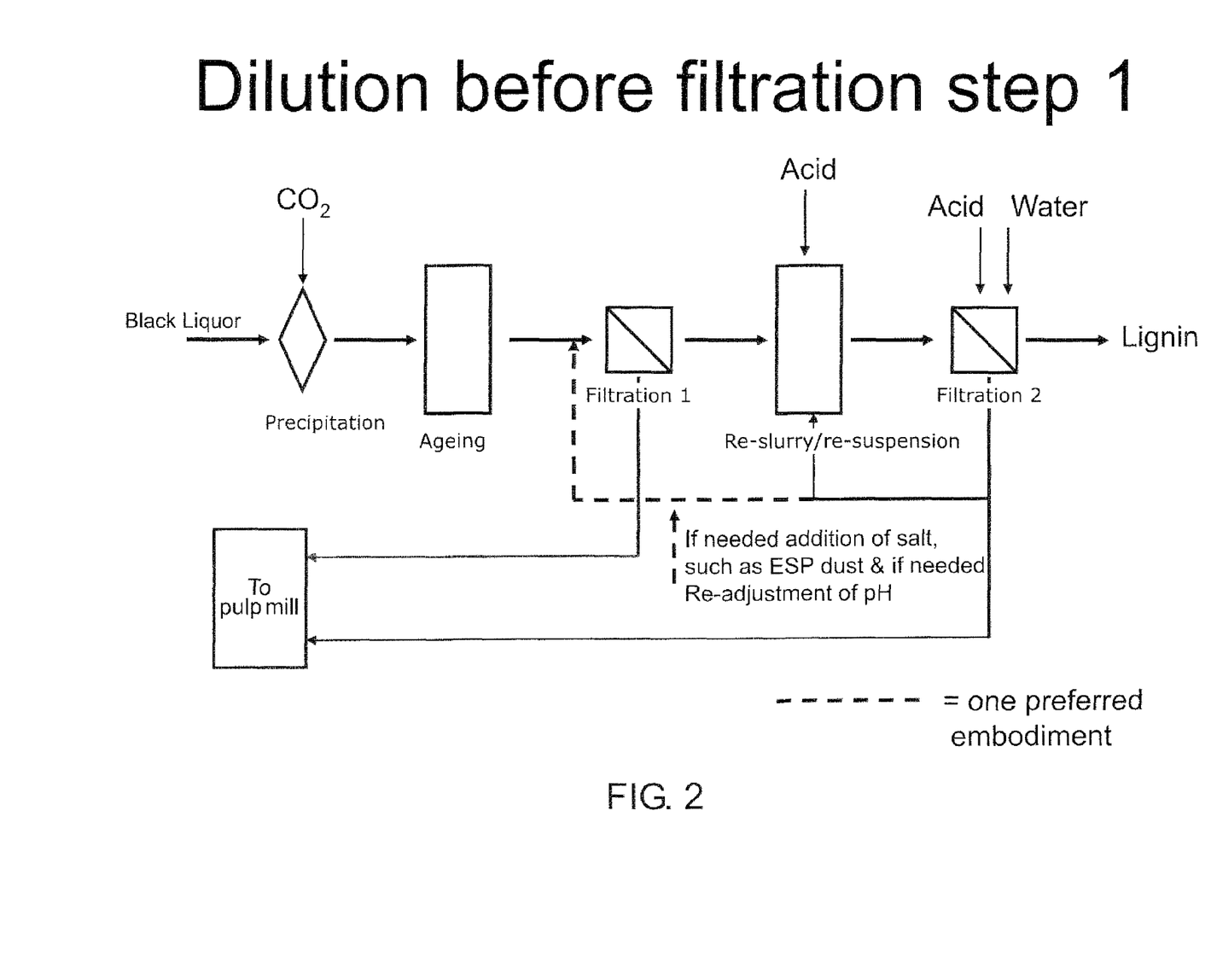
FIG. 2 shows one preferred embodiment of the invention; dilution before filtration step 1.

As can be seen from FIG. 1 the wash procedure according to the first aspect of the invention during 5 minutes (test 2) gave the best results. There the washing was driven as far as possible.

Example 3

In a case with a pulp mill producing 350.000 tonnes of pulp with 50.000 tonnes/year lignin production with the process as set out above according to the first aspect the need of 160 kg of $H_2SO_4$ is used per tonne of lignin, the need for external sodium hydroxide to handle the purge of ESP-dust is 92 kg per tonne of lignin. Per tonne of pulp this corresponds to 30 kg $H_2SO_4$ and 17 kg NaOH. By using electrolysis of ESP-dust the input of $H_2SO_4$ and thus the need to purge ESP-dust is reduced.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods can be combined with other known methods. Other aspects, advantages and modifications within the scope of the invention will be apparent to those skilled in the art to which the invention pertains.

CITED DOCUMENTS

WO2006/031175
WO2006/038863
Magnus Norgren, "On the Physical Chemistry of Kraft Lignin, Fundamentals and Applications", Doctoral Thesis, Physical Chemistry 1, Lund University, 2001
Fredrik Öhman "Precipitation and separation of lignin from kraft black liquor", Forest products and Chemical Engineering, Department of Chemical and Biological Engineering, Chalmers University of Technology, Göteborg, Sweden, 2006
Öhman, F. & Theliander, H., "Washing lignin precipitated from kraft black liquor", Paperi Ja Puu, Vol. 88, no 5, 287-292 (2006)
Öhman, F., Wallmo, H. & Theliander, H., "A Novel method for washing lignin precipitated from kraft black liquor—Laboratory trails", Nordic Pulp and Paper Research J., 22 (2007): 1, 9-16
and
U.S. Pat. No. 4,561,945

The invention claimed is:

1. A method for separation of lignin from black liquor comprising the following steps:
   a) precipitation of lignin by acidifying black liquor, resulting in a first lignin suspension and thereupon performing separation, thereby forming a first cake of solid material that is a first lignin filter cake,
   b) suspending the lignin filter cake obtained in step a) and during the suspension operation adjusting the pH level of the suspension to approximately the pH level of the wash water of step c) below, whereupon a second lignin suspension is obtained,
   c) separating the second lignin suspension thereby forming a second cake of solid material, thus a second filter cake, and thereafter adding acidified wash water for displacement washing followed by enhancement of the lignin filter cake dryness whereupon an acid filtrate is obtained, and
   d) conveying the filtrate from step c) or selected parts of the filtrate from step c) for dilution before separation in step a) and/or addition as wash water to the filter cake produced in step a), wherein the ionic strength is adjusted before addition by adding a salt, ESP dust, pulp mill recovery boiler precipitator dust or sodium sulfate in order to control an Na/S balance in a pulp mill, and the pH is adjusted by adding ESP-dust or pulp mill recovery boiler precipitator dust, and additional use of filtrate in step d) is to the suspension step of step b) or prior to the filtrations step of step c).

2. The method according to claim 1 wherein step d) also includes conveying filtrate back to the pulp mill.

3. The method according to claim 2 wherein optionally the filtrate from step c) is adjusted regarding ionic strength and pH, or to keep the pH equal to or below the pH to which precipitation in a) by further adjusting with $CO_2$, to avoid dissolution of lignin.

4. The method according to claim 1 wherein step d) also involves conveying filtrate from step c) either for using in a displacement washing of the lignin filter cake in step a) or for diluting the suspension before separation in step a), wherein the filtrate from step c) is adjusted regarding ionic strength and in pH, to keep the pH equal to or below the pH to which precipitation in a) has been adjusted to avoid dissolution of lignin.

5. The method according to claim 4 wherein the filtrate from step c) is adjusted to keep the pH equal to or below the pH to which precipitation in a) has been adjusted.

6. The method according to claim 4 wherein the pH level is adjusted to below approximately pH 6 in step b).

7. The method according to claim 1 wherein the fresh acidic liquid added in step b) comprises at least one of sulphuric acid or sequisulfate.

8. The method according to claim 1 wherein the fresh acidic liquid added in step b) is at least one of virgin sulphuric acid, sulphuric acid or sulphurous acid, both sulphuric acid or sulphurous acid being obtained from gaseous $SO_2$ optionally obtained by collecting recycled $H_2S$ gas from the suspending step b) and converting the recycled $H_2S$ gas into said $SO_2$, or sulphuric acid obtained by electrolysis of sodium sulphate.

9. The method according to claim 8 wherein the virgin sulphuric acid and/or sulphuric acid and/or sulphurous acid obtained from $SO_2$ is added to the filtrate conveyed in step d).

10. The method according to claim 1 wherein step b) and/or c) includes addition of at least one of acidic liquid, virgin acid or $CO_2$, in step d) filtrate is conveyed for performing a soap acidulation thereby providing tall oil.

11. The method according to claim 1 wherein step d) also includes conveying filtrate or parts of the filtrate to an external treatment step or effluent treatment.

12. The method according to claim 1 wherein step b) includes adjusting the pH level to below 11.

13. The method according to claim 12 wherein the washing water used in step c) has a pH level of below approximately pH 6.

14. The method according to claim 1 wherein the separation of step a) and/or step c) is performed using dewatering in a filter press wherein the filter cake is blown through by gas, a mixture of gases, flue gases, air, steam, or superheated steam, in order to dispose of the remaining liquid.

15. The method according to claim 1 wherein the lignin filter cake dryness of the filter cake obtained in step a) and/or c) is enhanced by displacement of the remaining liquid with gas, a mixture of gases, flue gases, air, steam or superheated steam.

16. The method according to claim 1 wherein the filtrate from the first separation stage step a) is re-circulated to the pulp mill recovery system, optionally after re-alkalization.

17. The method according to claim 1 wherein the remaining washing liquor in the filter cake in step c) is removed with air, flue gases, flue gases from a recovery boiler, a lime kiln or a bark boiler, steam or superheated steam.

18. The method according to claim 1 wherein in step a) the precipitation is performed with $CO_2$.

19. A method for separation of lignin from black liquor comprising the following steps:
   a) precipitation of lignin by acidifying black liquor, resulting in a lignin suspension and thereupon performing separation, thereby forming a first cake of solid material that is a lignin filter cake,
   b) suspending the lignin filter cake obtained in step a) and during the suspension operation adjusting the pH level of the suspension to below approximately 6, whereupon a second lignin suspension is obtained, and leaving said second lignin suspension to mature,
   c) separation of the second lignin suspension thereby forming a second cake of solid material, thus a second filter cake, and thereafter adding acidified wash water with a pH below approximately 6 for displacement washing followed by enhancement of the lignin filter cake dryness whereupon an acid filtrate is obtained, and d) conveying the filtrate from step c) or selected parts of the filtrate from step c) for use for dilution before separation in step a) and/or addition as wash water to the filter cake produced in step a), wherein the ionic strength is adjusted before addition by adding a salt, ESP dust, pulp mill recovery boiler precipitator dust or sodium sulfate in order to control sodium sulfate in a pulp mill, and the pH is adjusted by adding ESP-dust or pulp mill recovery boiler precipitator dust, and additional use of filtrate in step d) is to the suspension step of step b) or prior to the filtrations step of step c).

* * * * *